No. 681,237. Patented Aug. 27, 1901.
B. MASON.
QUICK TURNING VEHICLE GEAR.
(Application filed May 10, 1900.)
(No Model.) 2 Sheets—Sheet 1.
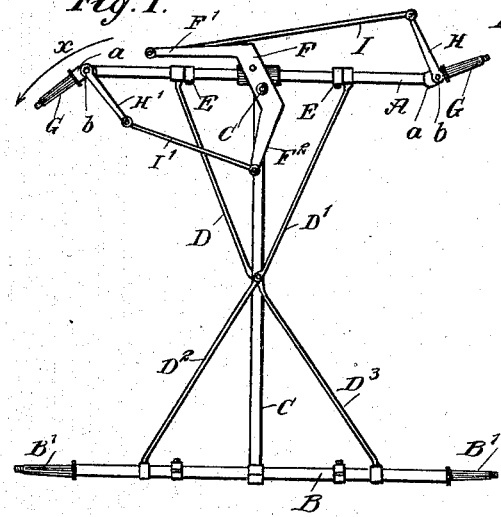
Fig. 1.
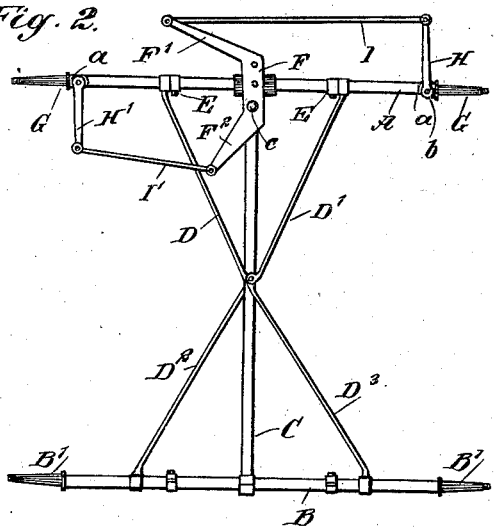
Fig. 2.
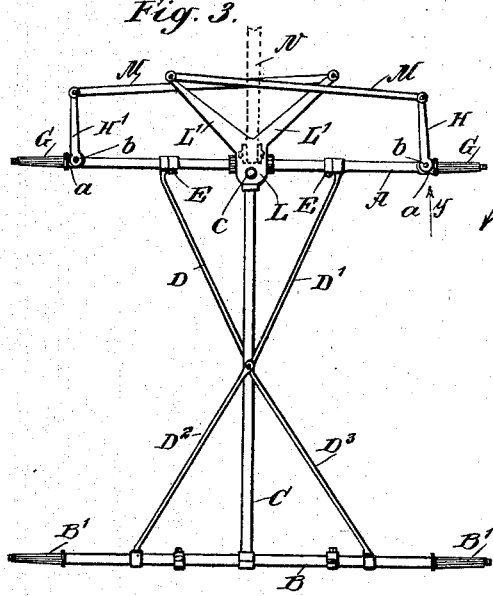
Fig. 3.
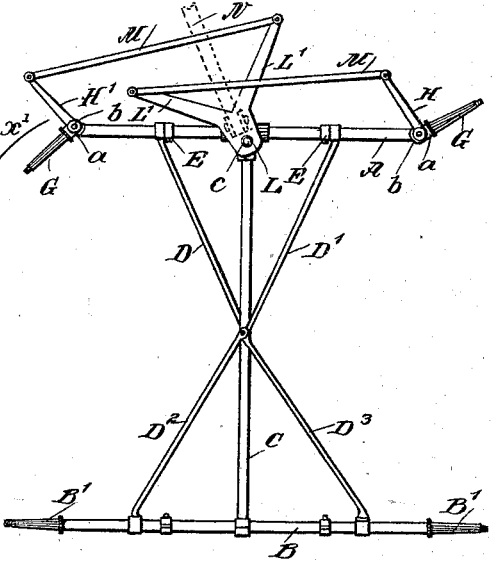
Fig. 4.
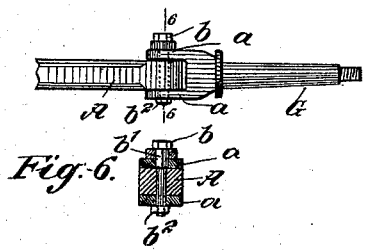
Fig. 5.
Fig. 6.
WITNESSES:
INVENTOR
Buck Mason.
BY
ATTORNEYS

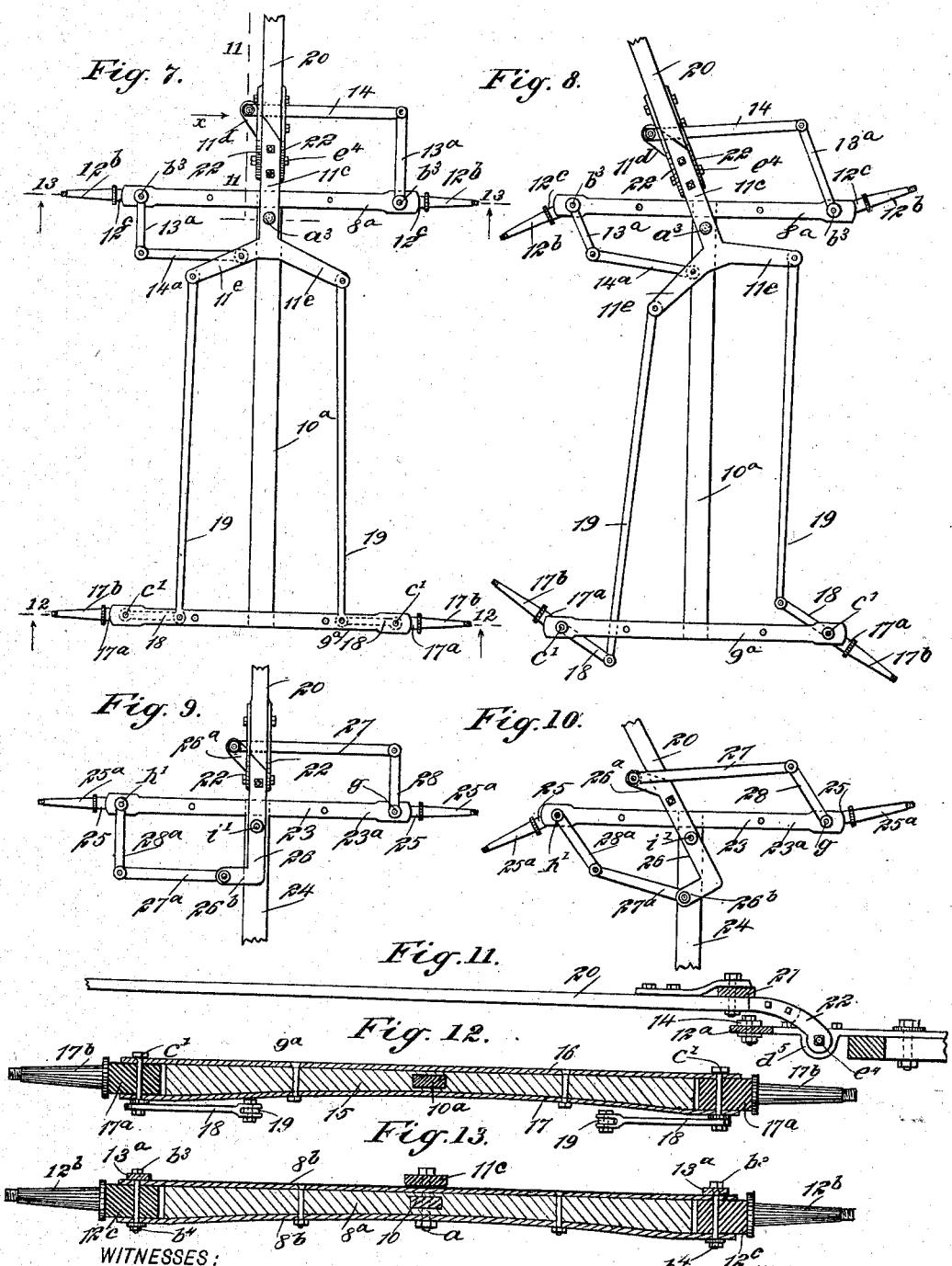

UNITED STATES PATENT OFFICE.

BUCK MASON, OF TRENTON, MISSOURI.

QUICK-TURNING VEHICLE-GEAR.

SPECIFICATION forming part of Letters Patent No. 681,237, dated August 27, 1901.

Application filed May 10, 1900. Serial No. 16,208. (No model.)

*To all whom it may concern:*

Be it known that I, BUCK MASON, a citizen of the United States, and a resident of Trenton, in the county of Grundy and State of Missouri, have invented a new and Improved Quick-Turning Vehicle-Gear, of which the following is a full, clear, and exact description.

The object of this invention is to provide a novel, simple, and practical running-gear for four-wheeled vehicles of various kinds which will enable the turning of the gear and vehicle completely in quite a small circle or arc of the same; and it consists in the construction and combination of parts, as is hereinafter described, and defined in the appended claims.

Reference is to be had to the accompanying drawings, forming a part of this specification, in which similar characters of reference indicate corresponding parts in all the figures.

Figure 1 is a plan view of a vehicle running-gear, showing the relative position of parts thereof during a turning movement in direction of the arrow $x$ in said figure. Fig. 2 is a plan view of the same with details adjusted for a straightforward movement of the vehicle. Fig. 3 is a plan view of the gear, showing a modified form and arrangement of parts that are the equivalents of those shown in Figs. 1 and 2. Fig. 4 is a plan view of the gear shown in Fig. 3, showing the position of details during the turning movement in direction of the arrow $x'$ in said figure. Fig. 5 is an enlarged side view of an end portion of a front axle seen in direction of the arrow $y$ in Fig. 3, showing features of improvement. Fig. 6 is a transverse sectional view substantially on the line 6 6 in Fig. 5. Fig. 7 is a plan view of the improvement adapted for use on heavy wagons, the parts being adjusted for a direct forward progressive movement. Fig. 8 is a plan view of the modified form of the improvement shown in Fig. 7 with parts in position assumed during the turning movement of the gear toward the left hand. Fig. 9 is a plan view of the front axle for a heavy wagon having the turning mechanism constructed and arranged nearly similar to that shown in Fig. 2. Fig. 10 is a plan view of the gear shown in Fig. 9, representing it turned to the left hand. Fig. 11 is an enlarged partly-sectional side view of the forward portions of the improvement in connection with a wagon-pole, the view being substantially on the line 11 11 in Fig. 7. Fig. 12 is an enlarged longitudinal sectional view of the rear axle of the running-gear shown in Fig. 7 substantially on the line 12 12 in Fig. 7; and Fig. 13 is an enlarged longitudinal sectional view of the forward axle, taken substantially on the line 13 13 in Fig. 7.

In the drawings that indicate the construction and operation of the improvements as exemplified in Figs. 1 to 6, inclusive, A indicates the front axle of the running-gear, and B the rear axle thereof. The front and rear axles are spaced apart a proper distance in parallel planes by the reach-bar C and four braces D D' $D^2 D^3$, which are clipped by their ends upon the axles, as shown, said braces extending diagonally outward from a point near the center of the reach-bar to the forward and rear axles, and stops E E in clamp form are placed on the forward axle A, so as to bear against the inner sides of the clips on the ends of the braces, whereby the latter are held outwardly strained to render the connections taut, as in this construction the entire gear is as light as is consistent with necessary strength.

In Figs. 1 and 2, F represents a flat lever having a laterally-extending arm or limb F' formed thereon and an arm $F^2$ extended diagonally from the rear end thereof. The lever F is pivoted upon the reach-bar rearward of and near to the front axle A, as at $c$, and when in place the arm or limb F' may, as shown, extend leftward and the arm $F^2$ be also located so as to trend toward the left side of the reach-bar C when the parts are adjusted as shown in Fig. 2. On each end of the axle A a stub-spindle G is pivoted, so as to be adapted to swing toward the front and rear sides of the same, and, as shown clearly in Figs. 5 and 6, the head-block on each spindle is furnished with two parallel-spaced flanges $a$, that embrace the end portion of the axle upon which the spindle is to be mounted. An arm H is provided for each right-hand stub-spindle G, and these arms are respectively connected with an appropriate stub-spindle by a bolt $b$. As shown, the bolt $b$ for each stub-spindle has an angular formation $b'$, extended from the head of the bolt, of sufficient length to pass through a mating perforation in the arm H near one end and also through the top flange $a$ of the head-block forming the inner end of the stub-spindle. The body of the bolt $b$ below the angular formation $b'$ is truly cylindrical and loosely fits in a perforation extending through the end of the axle embraced by the parallel flanges $a$ and through an opposite perforation in the lower flange $a$ and extending below the same sufficiently to receive a nut $b^2$, that screws upon a thread on said projecting end. It will be seen that the arm H on the right-hand stub-spindle (shown in Figs. 1 and 2) extends forwardly of the axle A and is firmly secured by the angular formation $b'$ on the bolt-body $b$ upon the top flange $a$ of the stub-spindle and projects therefrom approximately at a right angle. In a like manner the stub-spindle on the left-hand end of the forward axle A is secured by a bolt $b$ upon the arm H', that is complementary to said stub-spindle, the arm projecting rearwardly from the stub-spindle at a right angle. A connecting-rod I is pivoted by its ends, respectively, upon the outer end of the arm or limb F' and arm H, said rod passing below the lever F, whereon the rear end of a draft-pole may be secured in any suitable manner. The arm H' is loosely connected to the arm $F^2$ on the lever F by a rod I', pivoted by its ends thereto and passing above the reach-bar C and brace D. The rear axle B in this gear is provided with the usual spindles B', that are rigid projections from the ends thereof. It will be seen that the rocking movement of the lever F toward the right or left hand side of the vehicle will actuate the stub-spindles G, so as to dispose them at an angle to the body of the axle A. As indicated in Fig. 1, the rocking movement of the arm or limb F' toward the left side of the vehicle-gear, as indicated by the arrow $x$, moves the stub-spindle G at said side so as to incline it rearward, and simultaneously the stub-spindle at the right-hand side of the running-gear is rocked forwardly. It will be seen that the construction of the lever F, having its arm or limb F' and arm $F^2$ extending at the same side of the body of the lever, and the relative position of the pivot-bolt $c$ causes the arm $F^2$ to give a greater rocking movement to the left-hand stub-spindle than the right-hand stub-spindle receives. To more specifically describe the relative movements of the right and left hand stub-spindles G, as represented in Fig. 1, it will be observed that as the arm or limb F' is rocked it approaches the axle A and pulls nearly in the same line with the connecting-rod I, which will tend to reduce the longitudinal movement of said rod somewhat as compared with the degree of endwise movement had by the rod I'. Although this difference of movement is not great, yet it is sufficient to properly dispose the spindle toward which the vehicle-gear is turning, and thus compensate for the difference in travel of the outer wheel and inner wheel of the vehicle during a turning movement, which is a feature of great advantage, as it permits a very quick turning of the gear without requiring the outer wheel to slide on the ground, and this constitutes a leading feature of my invention.

In Figs. 3 and 4 is shown a device substantially similar to that represented in Figs. 1 and 2, and, as shown, comprises the same construction with regard to the axles A B, reach-bar C, braces D, and stub-spindles G. In this case, however, the lever L, that serves the same purpose as the lever F, is furcated, and the two equal arms or limbs L' thereon project forwardly of the axle A. The rock-arms H H' are both secured to project forwardly of the axle A in this construction, and at their outer ends one end of a respective connecting-rod M is pivoted, opposite ends of said rods being pivoted upon the arms or limbs of the lever L, one rod connecting with the arm or limb of the lever nearest the arm H' and the other rod connecting with the arm or limb of the lever nearest the arm H. A draft-pole N (shown by dotted lines in Figs. 3 and 4) may be held at its rear end on the top of the lever L, so that it may vibrate from a horizontal plane, and it will be seen that if such pole is provided for the running-gear the lateral movement—say in the direction of the arrow $x'$ in Fig. 4—will adjust the stub-spindles G in said figure similar to the adjustment of the stub-spindles shown in Fig. 1, and the advantage secured of a quick-turning easy movement for the vehicle-gear is the same.

In Figs. 7 and 8 is shown another modification of the quick-turning gear wherein the device is constructed to rock stub-spindles on the rear axle in unison with those on the front axle and comprises the following details and combinations of the same: $8^a$ designates the front axle of a vehicle having some of the improved features of construction, and $9^a$ is the rear axle thereof, essentially similar to the front axle, these parts of the running-gear, specially adapted for use on a heavy draft-wagon, being rigidly connected together and suitably spaced apart by the reach-bar $10^a$. A flat rocking lever $11^c$ is pivoted upon the upper face of the reach-bar $10^a$, and, as shown in Figs. 7 and 8, it will be seen that said lever is provided with an arm $11^d$ at the forward end, which projects from the straight body of the lever laterally and forwardly. The pivot-bolt $a^3$, which loosely connects the lever $11^c$ with the reach-bar $10^a$, is positioned near the rear side of the front axle $8^a$, and at a suitable distance rearward therefrom two angularly-divergent arms or limbs $11^e$ are integrally extended laterally and rearwardly from the straight body of said lever. The construction of the axles $8^a$ and $9^a$ (shown in Figs. 12 and 13) each comprises the following details: The body or main portion of, say, the axle $8^a$ is preferably formed of hard tough wood, such as ash or hickory, and may be rendered somewhat concave on the lower side, as shown. Two reinforce-plates $8^b$, of iron or other suitable metal, are provided for the axle-body $8^a$, said plates being respectively fitted upon the upper and lower sides of the axle-body. As shown clearly in Fig. 13, the reinforce-plates $8^b$ project somewhat at each end of the wooden axle-body $8^a$, and these projections at each end are parallel with each other. Two similar stub-spindles are provided for the axle $8^a$, and each stub-spindle consists of a tapered portion $12^b$, which is formed integral with and is projected from the rectangular body $12^c$ of the spindle. The stub-spindle bodies $12^c$ have such proportionate length and thickness as will adapt them to respectively occupy the space provided between the parallel projecting portions of the reinforce-plates $8^b$ at each end of the axle-body $8^a$. As clearly shown in Fig. 13, a pivot-bolt $b^3$ is inserted in vertically-alined perforations formed in the reinforce-plates $8^b$ and through each end portion $12^b$ of the stub-spindles, said bolts being respectively affixed in the ends of rock-arms $13^a$, loosely seated upon the top reinforce-plate $8^b$ of the axle $8^a$, said pivot-bolts being secured from displacement by nuts $b^4$. One rock-arm $13^a$, preferably that at the right-hand side of the running-gear viewed from the rear, is projected forwardly of the front axle and is pivoted at its front end upon one end of a link-bar 14, which at its opposite end is pivoted upon the free end of the arm $11^d$ on the lever $11^c$. The lengths of the link-bar 14 and rock-arm $13^a$ adapt said parts to be disposed at a right angle where pivoted together when the spindles $12^b$ and axle-body $8^a$ are in longitudinal alinement, as shown in Fig. 7. The other rock-arm $13^a$, which is positioned near the right-hand end of the front axle $8^a$, as seen from the rear end of the running-gear, projects rearward from said axle and at its rear end is pivoted upon the outer end of a link-bar $14^a$, which has its opposite end pivoted upon one arm or limb $11^e$ of the lever $11^c$, and preferably said link and rock-arm are disposed at a right angle to each other when the front-axle spindles are axially alined. The rear axle $9^a$ has a preferably wooden body 15, that may have its lower side rendered concave, as shown in Fig. 12, and upon the flat upper side and concave lower side of said wooden axle-body iron or other metallic reinforce-plates 16 17 are respectively secured by bolts or other means. The ends of the reinforce-plates 16 17 extend beyond the ends of the axle-body 15 an equal degree, and said ends are rendered parallel in pairs for the loose reception of the inner ends of the stub-axles $17^a$, whereon the spindles $17^b$ are formed and project from their outer ends. A pivot-bolt $c'$ occupies a vertical perforation formed in each stub-axle $17^a$ and the reinforce-plates 16 and 17, and, as shown best in Fig. 12, a rock-arm 18 is rigidly affixed by one end upon the lower projecting end of each pivot-bolt $c'$, and it will be seen that said arms are projected inwardly with their bodies alined when the stub-axles $17^a$, having the spindles $17^b$, are located in the same plane. Two similar connecting-rods 19 are provided, having their forward ends pivotally secured upon the outer ends of the arms or limbs $11^e$ of the lever $11^c$, the rear ends of said connecting-rods having pivoted connection with the free inner ends of the rock-arms 18, and it will be seen in Fig. 7 that from the alined disposal of the rock-arms 18 relative to the spindles $17^b$ the forward spindles $12^b$ and rear spindles $17^b$ will be held parallel with each other in pairs when the lever $11^c$ is alined with the reach-bar $10^a$, as shown in Fig. 7. A draft-pole 20 is furnished to control the progressive movement of the running-gear and, as shown best in Fig. 11, consists of the usual elongated bar, having a doubletree 21 pivoted thereon near its rear end for a harnessed connection of a pair of draft-animals to the draft-pole. Two connecting-plates 22 of like form are secured oppositely upon the sides of the pole 20 near its rear end, and these plates are curved downwardly edgewise, so as to dispose their lower ends a suitable distance below the body of the pole. The lower ends of the connecting-plates 22 embrace the sides of a boss $d^5$, that is formed upon the lower side of the lever $11^c$, near the front face of the axle $8^a$, and the plates and boss are pivotally connected by the pivot-bolt $e^4$. It will be seen that by the described construction and arrangement of parts the body of the pole 20 is disposed above the arm $11^d$ of the lever $11^c$ and also above the link-bar 14, so that the latter may move freely and not come in contact with the pole in service, as the pole will then always be maintained either in a horizontal plane or above it. In operation it will be seen that the swinging movement of the pole 20 toward either end of the front axle $8^a$ will vibrate the lever $11^c$ and, as shown in Fig. 8, will so arrange the relative positions of connected parts that the right-hand spindle of the front axle will be disposed diagonally forward and the left-hand spindle disposed diagonally rearward a somewhat greater degree or equal to the movement of the stub-spindle G on the left-hand end of the axle A in Fig. 2. Simultaneously the right-hand spindle on the rear axle will be moved diagonally rearward and the left-hand spindle on the rear axle be disposed diagonally forward, whereby the running-gear will be so adjusted in its working parts that a leftward movement of the team of draft-animals connected with the pole 20 will obviously effect a quick turning movement of the vehicle in a like direction, and thus compensate for the greater travel of the wheel on the right-hand spindle. It will be manifest that a movement of the draft-pole 20 toward the right hand from a position of alinement with the reach-bar $10^a$ will dispose the spindles on the front and rear axles of the running-gear in a manner directly opposite from that just described and adapt the gears to receive a quick turning movement toward the right hand instead of the left, as previously described.

In Figs. 9 and 10 is shown a slightly-changed construction of the running-gear, in which only the front axle is controlled by the improvements in a manner similar to that shown in Figs. 1 and 2; but an axle like that shown in Fig. 13 is here employed. In this construction 23 indicates the front axle and 24 the reach-bar rigidly affixed to said axle in completed form, the reach-bar having a firm connection with any preferred form of rear axle having the usual spindles projecting therefrom. The axle 23 is provided with stub-axles 25, each having an integral spindle 25$^a$, said stub-axles being, respectively, pivoted between projecting ends of reinforce-plates 23$^a$, similar to the reinforce-plates 8$^b$, previously described. In this construction of the improvement the lever-plate 26 has a forward arm 26$^a$, extended laterally and forwardly, and but a single arm or limb 26$^b$ at the rear end, forming a right angle with the lever-plate, from which it extends laterally. Upon the forward end of the arm 26$^a$ one end of a link-bar 27 is pivoted, and at the opposite end thereof the forward end of a rock-arm 28 is pivoted, which is firmly affixed at its rear end upon the upper end of a pivot-bolt $g$, that pivots the inner end of the stub-axle 25 between the reinforce-plates 23$^a$ at the right-hand end of the axle 23. The pivot-bolt $h'$, that loosely secures the inner end of the left-hand short stub-axle 25 in position, is at the upper end firmly affixed in a perforation in one end of a rock-arm 28$^a$, which projects rearwardly from the axle 23 and at its rear end is pivoted upon the outer end of a link-bar 27$^a$, which at the inner end thereof is pivoted upon the lateral arm or limb 26$^b$, at the outer end of said arm. It will be evident that by the construction of parts just described the pole 20, which is constructed and connected with the lever-plate 26, similarly to its connection with the lever-plate 11$^c$, will by its lateral vibration to the right or left similarly rock the lever-plate 26 upon its pivot $i'$, that loosely secures said plate upon the reach-bar 24, which movement of parts will serve to dispose the stub-axles 25 so that the spindles thereon will be diagonally positioned one forward of the axle and one rearward thereof, as clearly shown in Fig. 10, whereby the lateral movement of the draft-pole a moderate degree will cause a quick-turning adjustment of the vehicle running-gear.

It will be seen that the improved quick-turning vehicle-gear herein described is well adapted for use either when the vehicle is drawn or propelled with motive force other than draft-animals, and in case the vehicle is not drawn it is obvious a draft-pole may be dispensed with, as represented in Figs. 1 and 2, and the actuating-lever be rocked laterally by means carried on the vehicle and controllable by an occupant thereof.

Having thus described my invention, I claim as new and desire to secure by Letters Patent—

1. In a vehicle running-gear having front and rear axles rigidly connected by a reach-bar, the combination with the front axle, of stub-axles having spindles thereon, arms arranged at an angle to the spindles of the stub-axles, bolts passed loosely through the ends of the front axle and engaging the said arms and serving to rigidly connect said arms to the stub-axles, and also pivoting said stub-axles to the ends of the front axle, a laterally-rockable lever pivoted upon the reach-bar, and rods connecting the said lever to the arms on the stub-axles.

2. In a vehicle running-gear, the combination with an axle of the vehicle, of stub-axles having spindles thereon, arms on the stub-axles, bolts passed loosely through the ends of the axle and arranged to engage the arms to rigidly connect said arms to the stub-axles, the said bolts also pivoting said stub-axles to the ends of the axle, a laterally-rockable lever, and connections between the said lever and the arms on the stub-axles.

3. In a vehicle running-gear, the combination with two main axles held in parallel planes by a reach-bar and diagonal braces, two laterally-rockable stub-axles, having spindles, on the forward main axle, and having flanges adapted to embrace the ends of said main axle and pivoted thereon, rock-arms connected with the stub-axle spindles at an angle thereto, and bolts rigidly securing the said arms to the stub-axles, the said bolts also forming the pivotal connection between the flanges of the stub-axles and the ends of the main axle, of a lever-plate pivoted upon the reach-bar or forward main axle, lateral arms on the lever, and link-bars pivoted at their ends upon the ends of the rock-arms and upon the respective arms of the lever-plate, the said lever and its arms being so arranged that a rocking movement of said lever-plate will so move the link-bars as to give the stub-axle spindle toward which the vehicle-gear turns a greater inclination from the main axle than the other stub-axle spindle receives.

4. A vehicle running-gear, comprising a front axle and a rear axle, a reach-bar connecting said axles, diagonal braces extending from the reach-bar to the front and rear axles, stops on the front axle arranged to bear against the inner sides of the ends of the braces, stub-axles having spindles thereon and held to rock laterally on the ends of the front axle, a laterally-rockable lever having a body portion pivoted upon the reach-bar at or near the front axle, and arms on the lever and connected with the stub-axles for rocking the stub-axles by the movement of the lever.

5. In a vehicle running-gear, the combination with a front axle and a rear axle, both rigidly connected in parallel planes by a reach-bar, of laterally-rockable stub-spindles on the forward axle, arms located at an angle to the stub-spindles, bolts for securing the arms to the stub-spindles, the said bolts each having an angular formation at one end fitting corresponding perforations in the arms and in the inner end of the corresponding stub-spindle, the bodies of the bolts extending loosely through the ends of the main axle and forming the pivotal connections between the stub-axles and the said main axle, a laterally-rockable lever pivoted upon the reach-bar, and rods connecting the said lever with the free ends of said arms for rocking the stub-axles by the movement of the lever.

6. In a vehicle running-gear, the combination with a front axle, and a rear axle both rigidly connected in parallel planes by a reach-bar, of a stub-axle on each end of the front axle, said stub-axles being pivoted to rock laterally, a pivoted lever-plate extending forward and rearward of the axle and having arms at its ends, a fixed rock-arm on the pivot-bolt of each stub-axle, and arranged at an angle to the stub-axle spindles, the said rock-arms extending in opposite directions, and connecting-rods between the ends of the rock-arms and the arms of the pivoted lever-plate.

7. In a vehicle running-gear, the combination with the front axle of stub-axles having spindles thereon, rock-arms arranged at an angle to the spindles of the stub-axles and extending in opposite directions, bolts arranged to turn loosely in the ends of the front axle and rigidly connecting said arms to the stub-axles and also pivoting said stub-axles to the ends of the front axle, a pivoted lever provided with arms, and rods connecting the said lever with the free ends of said rock-arms.

8. In a vehicle running-gear, the combination with the front main axle, and laterally-rockable stub-axles at the ends of the front main axle and having spindles, of a lever having a body portion pivoted at a point adjacent to the front axle, the ends of the body portion extending respectively forward and rearward of the front axle, arms on the ends of the lever, rock-arms connected with the stub-axles and link-bars connecting the arms of the lever with the arms of the stub-axles.

In testimony whereof I have signed my name to this specification in the presence of two subscribing witnesses.

BUCK MASON.

Witnesses:
 JACK RYAN,
 R. C. WEST.